(12) United States Patent
Usami (10) Patent No.: US 12,288,312 B2
(45) Date of Patent: Apr. 29, 2025

(54) IMAGE PROCESSING APPARATUS, IMAGE PROCESSING METHOD, IMAGING APPARATUS, AND STORAGE MEDIUM FOR CAPTURING IMAGES HAVING DIFFERENT FOCUS POSITIONS (71) Applicant: CANON KABUSHIKI KAISHA, Tokyo (JP)

(72) Inventor: Hiroki Usami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 216 days.

(21) Appl. No.: 18/063,020

(22) Filed: Dec. 7, 2022

(65) Prior Publication Data

US 2023/0186449 A1 Jun. 15, 2023

(30) Foreign Application Priority Data

Dec. 10, 2021 (JP) ................. 2021-200665

(51) Int. Cl.
*G06T 5/50* (2006.01)
*G03B 13/36* (2021.01)
*G06T 7/50* (2017.01)
*G06T 7/70* (2017.01)
*G06V 20/00* (2022.01)
*H04N 23/67* (2023.01)

(52) U.S. Cl.
CPC ............... *G06T 5/50* (2013.01); *G03B 13/36* (2013.01); *G06T 7/50* (2017.01); *G06T 7/70* (2017.01); *G06V 20/38* (2022.01); *H04N 23/676* (2023.01); *G06T 2207/20221* (2013.01); *G06T 2207/30242* (2013.01)

(58) Field of Classification Search
None
See application file for complete search history.

(56) References Cited

U.S. PATENT DOCUMENTS

| 2010/0201835 | A1* | 8/2010 | Onoda | H04N 23/635 |
| | | | | 348/222.1 |
| 2011/0292235 | A1* | 12/2011 | Takada | H04N 23/667 |
| | | | | 348/222.1 |
| 2014/0176783 | A1* | 6/2014 | Shibagami | H04N 23/673 |
| | | | | 348/349 |
| 2014/0184848 | A1* | 7/2014 | Shimosato | H04N 23/632 |
| | | | | 348/222.1 |
| 2017/0244938 | A1* | 8/2017 | Al Mohizea | H04N 23/65 |
| 2018/0124297 | A1* | 5/2018 | Matsuhashi | H04N 23/667 |

FOREIGN PATENT DOCUMENTS

JP 2016039613 A 3/2016

* cited by examiner

*Primary Examiner* — Anh-Tuan V Nguyen
(74) *Attorney, Agent, or Firm* — Canon U.S.A., Inc. IP Division (57) ABSTRACT

Provided is an imaging apparatus including a determination unit configured to perform scene determination and a combination unit configured to combine a plurality of images different in focus position in an optical axis direction. The combination unit automatically performs the combination based on a result of the scene determination. A composite image to be generated in a case where the combination unit performs the combination is deeper in depth of field than the plurality of images.

16 Claims, 6 Drawing Sheets

IMAGE PROCESSING APPARATUS, IMAGE PROCESSING METHOD, IMAGING APPARATUS, AND STORAGE MEDIUM FOR CAPTURING IMAGES HAVING DIFFERENT FOCUS POSITIONS

BACKGROUND

Field of the Disclosure

The present disclosure relates to image processing apparatuses, and in particular to an imaging apparatus that captures images different in focus position.

Description of the Related Art

A technique of focus stacking in which a plurality of images different in focus position in an optical axis direction is captured (focus bracketing), and in-focus regions of the respective images are extracted to combine an image extended in depth of field, has been known.

To generate a focus stacking image intended by a user, setting of an appropriate depth of field is required.

Japanese Patent Application Laid-Open No. 2016-39613 discusses a method of generating a composite image based on distance information on an optional range designated by a user on a screen.

By the existing technique discussed in Japanese Patent Application Laid-Open No. 2016-39613, however, an image processing apparatus cannot determine the range of the focus stacking and the like without operation by the user.

SUMMARY

Some embodiments of the present disclosure are directed to an image processing apparatus that can set focus stacking without operation by a user.

According to an aspect of the present disclosure, an imaging apparatus includes a determination unit configured to perform scene determination and a combination unit configured to combine a plurality of images different in focus position in an optical axis direction. The combination unit automatically performs the combination based on a result of the scene determination. A composite image to be generated in a case where the combination unit performs the combination is deeper in depth of field than the plurality of images.

Further features of various embodiments will become apparent from the following description of exemplary embodiments with reference to the attached drawings.

DESCRIPTION OF THE EMBODIMENTS

Exemplary embodiments of the present disclosure will be described in detail below with reference to accompanying drawings. The following exemplary embodiments do not limit every embodiment according to the claims, and not all of combinations of characteristics described in the exemplary embodiments are necessarily essential for solving means of every embodiment.

Figure 1:
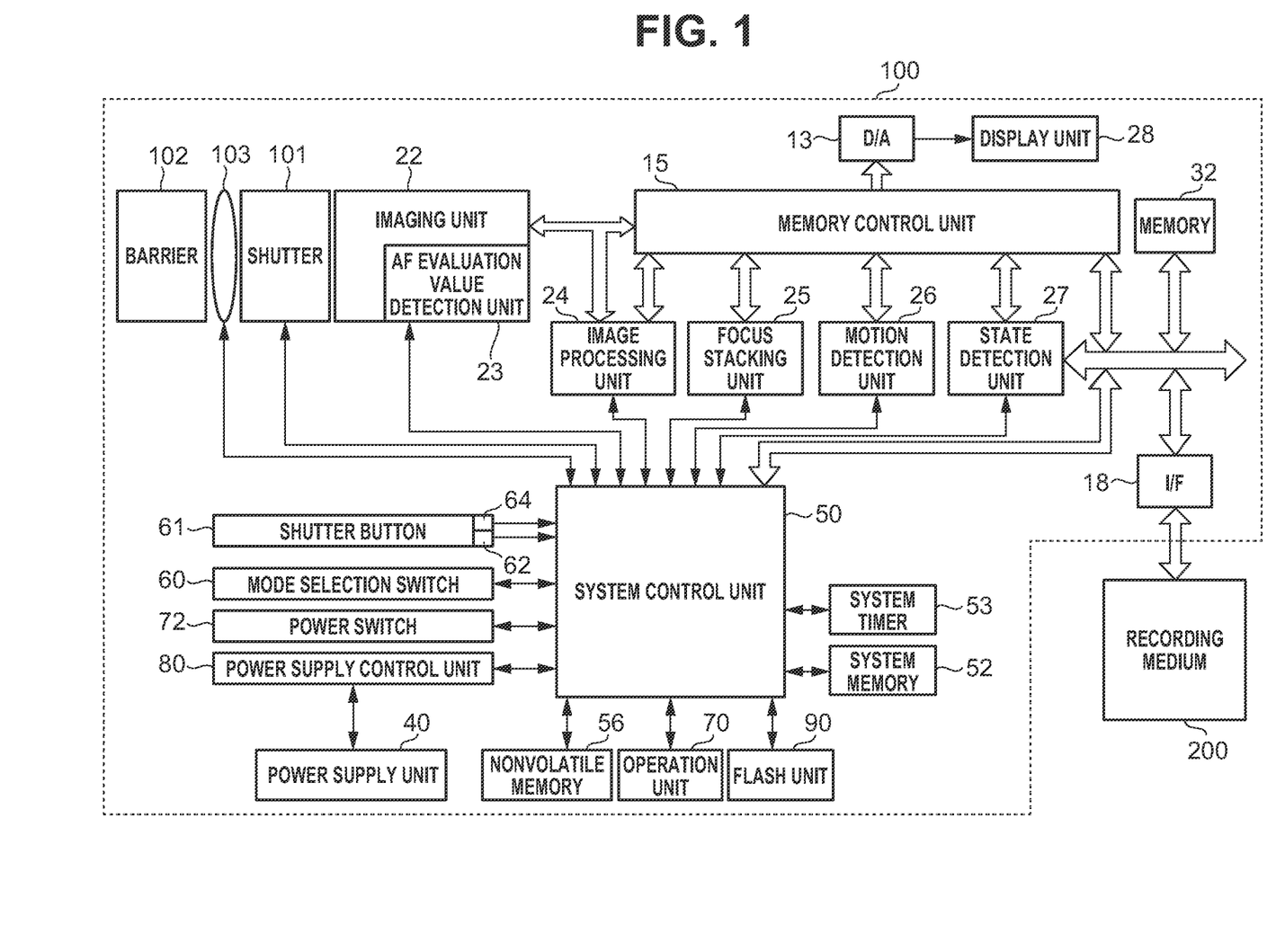
FIG. 1 is a block diagram illustrating a hardware configuration of a digital camera as an image processing apparatus according to an exemplary embodiment of the present disclosure.

A first exemplary embodiment of the present disclosure will be described below. FIG. 1 is a block diagram illustrating a hardware configuration of a digital camera 100 serving as an image processing apparatus according to the present exemplary embodiment. In FIG. 1, the digital camera 100 includes an imaging system including a shutter 101, a barrier 102, a focus lens 103, and an imaging unit 22. The shutter 101 has a diaphragm function. The barrier 102 covers the imaging system of the digital camera 100 to prevent the imaging system from being stained and damaged. The focus lens 103 is a lens included in a lens unit (not illustrated) disposed between the shutter 101 and the barrier 102. This lens unit includes other lenses, such as a zoom lens. The imaging unit 22 includes an imaging element, such as a charge coupled device (CCD) image sensor and a complementary metal-oxide semiconductor (CMOS) image sensor, that converts an optical image into an electric signal, and includes an analog-to-digital (A/D) conversion processing function. Output data (a captured image) from the imaging unit 22 is written in a memory 32 via an image processing unit 24 and a memory control unit 15 or is directly written in the memory 32 through the memory control unit 15. In focus bracketing described below, the set number of captured images are all written in the memory 32.

The digital camera 100 further includes an autofocus (AF) evaluation value detection unit 23, a flash unit 90, the image processing unit 24, a focus stacking unit 25, a motion detection unit 26, a state detection unit 27, the memory 32, a digital-to-analog (D/A) converter 13, a display unit 28, a nonvolatile memory 56, a system control unit 50, a system memory 52, and a system timer 53. The AF evaluation value detection unit 23 is provided inside the imaging unit 22, calculates an AF evaluation value from, for example, contrast information obtained from a digital image signal, and outputs the obtained AF evaluation value from the imaging unit 22 to the system control unit 50. The flash unit 90 emits light at imaging, to supplement illuminance at imaging in a low-illuminance scene and at imaging in a backlight scene. The image processing unit 24 performs predetermined pixel interpolation, resize processing such as reduction, and color conversion processing on the image data output from the imaging unit 22 or the image data from the memory control unit 15. The image processing unit 24 performs predetermined calculation processing by using the captured image data. The system control unit 50 performs exposure control and ranging control based on an obtained calculation result. Thus, a through-the-lens (TTL) autoexposure (AE) processing and automatic flash-light control emission (EF) processing are performed. Further, the image processing unit 24 performs autofocus (AF) processing. At this time, the output of the AF evaluation value detection unit 23 in the imaging unit 22 is used in some cases. The image processing unit 24 further performs predetermined calculation processing using the captured image data, and performs TTL automatic white balance (AWB) processing based on an obtained calculation result.

The focus stacking unit 25 outputs in-focus pixels in each of a plurality of captured images obtained by the focus bracketing of the imaging unit 22, thus generating an image extended in depth of field. The details thereof will be described below.

The motion detection unit 26 performs template matching processing at a region of interest and the vicinity thereof using two pieces of image data, and calculates a motion vector for each of a plurality of regions into which the images are divided or for each of pixels. In a case where the calculated motion vector is greater than or equal to a threshold, the motion detection unit 26 detects that the subject has moved, and notifies the system control unit 50 that the subject has moved. The state detection unit 27 detects a state of the digital camera 100, such as an angular velocity obtained by a gyroscope sensor, an attachment/detachment state of a tripod, and setting details set by the user using an operation unit 70. The state detection unit 27 notifies the system control unit 50 of a detection result.

The memory 32 stores the image data acquired and A/D-converted by the imaging unit 22, and image data to be displayed on the display unit 28. The memory 32 has a storage capacity sufficient to store a predetermined number of still images and a moving image and sound for a predetermined time. The memory 32 also functions as an image display memory (video memory). The D/A converter 13 converts image display data stored in the memory 32, into analog signals, and supplies the analog signals to the display unit 28.

Thus, the display image data written in the memory 32 is displayed by the display unit 28 through the D/A converter 13. The display unit 28 performs display corresponding to the analog signals from the D/A converter 13, on a display, such as a liquid crystal display (LCD). The D/A converter 13 converts the digital signals that have been A/D-converted by the imaging unit 22 once and stored in the memory 32 into analog signals, and the analog signals are successively transferred to and displayed on the display unit 28. Thus, the display unit 28 functions as an electronic viewfinder and can display a through-the-lens image (hereinafter, referred to as live view). The nonvolatile memory 56 is an electrically erasable and recordable memory, and for example, a flash memory is used as the nonvolatile memory 56. The nonvolatile memory 56 stores constants for operation of the system control unit 50, programs, and the like. The programs indicate herein programs to perform various flowcharts in the first to third exemplary embodiments, which are described below.

The system control unit 50 controls the entire digital camera 100. More specifically, the system control unit 50 realizes the focus bracketing based on subject information, a subject distance, and image contrast information by executing the programs recorded in the above-described nonvolatile memory 56. In other words, the system control unit 50 performs driving control of the focus lens 103 and the shutter 101 during the focus bracketing, thus sequentially capturing a plurality of images different in focus position. A focus position variation (focus step) between adjacent captured images obtained by such imaging processing is set based on a value calculated by the system control unit 50.

The system memory 52 includes a random access memory (RAM), and develops the constants and variables for operation of the system control unit 50, the programs read from the nonvolatile memory 56, and the like. The system control unit 50 also performs display control by controlling the memory 32, the D/A converter 13, the display unit 28, and the like. The system timer 53 is a clocking unit that clocks a time used for various controls and a time of a built-in clock.

The digital camera 100 includes an operation device to input various operation instructions to the system control unit 50. The operation device includes a mode selection switch 60, a shutter button 61, a first shutter switch 64, a second shutter switch 62, the operation unit 70, and a power switch 72.

The mode selection switch 60 switches an operation mode of the system control unit 50 to any of a still-image imaging mode, a moving-image imaging mode, a reproduction mode, and other modes. Examples of a mode included in the still image imaging mode include an automatic imaging mode, an automatic scene determination mode, a manual mode, various scene modes with imaging settings for different imaging scenes, a program AE mode, and a custom mode.

The operation mode is directly switched to any of those modes included in the still-image imaging mode with the mode selection switch 60. Alternatively, after the operation mode is switched to the still image imaging mode once with the mode selection switch 60, the operation mode may be switched to any of the modes included in the still-image imaging mode with other operation members. Similarly, the moving-image imaging mode may also include a plurality of modes. The shutter button 61 is an operation unit with which an imaging instruction is issued. The first shutter switch 64 is turned on in partway of an operation of the shutter button 61, specifically, when the shutter button 61 is half-depressed, thus generating a first shutter switch signal SW1. The operations, such as AF processing, AE processing, AWB processing, and EF processing, are started by the first shutter switch signal SW1. In other words, parameters for imaging are acquired under the control of the system control unit 50. The user can select, for example, center point AF processing and face AF processing as the AF processing to be started in response to the signal SW1. Herein, the center point AF processing indicates processing for performing AF on one center position in an image-capturing screen, and the face AF processing indicates processing for performing AF on a face detected by a face detection function in the captured screen. The second shutter switch 62 is turned on when operation of the shutter button 61 is completed, specifically, when the shutter button 61 is fully depressed (imaging instruction), thus generating a second shutter switch signal SW2. The system control unit 50 starts operation of a series of imaging processing from signal reading from the imaging unit 22 to writing of image data in a recording medium 200, in response to the second shutter switch signal SW2. When the user selects and operates various function icons displayed on the display unit 28, functions are appropriately assigned to operation members of the operation unit 70 for each scene, and the operation members of the operation unit 70 function as various function buttons. Examples of the function buttons include an end button, a return button, an image feeding button, a jump button, a narrowing-down button, and an attribute change button. For example, when a menu button is pressed, a menu screen on which various settings are settable is displayed on the display unit 28. The user can intuitively perform various settings using the menu screen displayed on the display unit 28, a four-direction button, and a SET button. The power switch 72 switches power-on and power-off of the digital camera 100.

The digital camera 100 further includes a power supply control unit 80, a power supply unit 40, and a recording medium I/F 18. The power supply control unit 80 includes a battery detection circuit, a DC-DC converter, and a switch circuit to switch a block to be energized, and detects presence/absence of an attached battery, a type of the battery, and a remaining battery level. The power supply control unit 80 controls the DC-DC converter based on a result of the detection and an instruction from the system control unit 50, and supplies a necessary voltage to each of the units including the recording medium 200 for a necessary period. The power supply unit 40 includes a primary battery, such as an alkaline battery and a lithium battery, a secondary battery, such as a NiCd battery, a NiMH battery, and a Li battery, or an alternating current (AC) adaptor. The recording medium I/F 18 is an interface to the recording medium 200, such as a memory card and a hard disk. The recording medium 200 is used to record the captured image, and includes a semiconductor memory or a magnetic disk.

Next, outline of the focus bracketing will be described with reference to FIG. 1. The focus bracketing is imaging in which the focus lens 103 is moved to a desired focus position, and then exposure and reading of the imaging unit 22 are performed.

Figure 2:
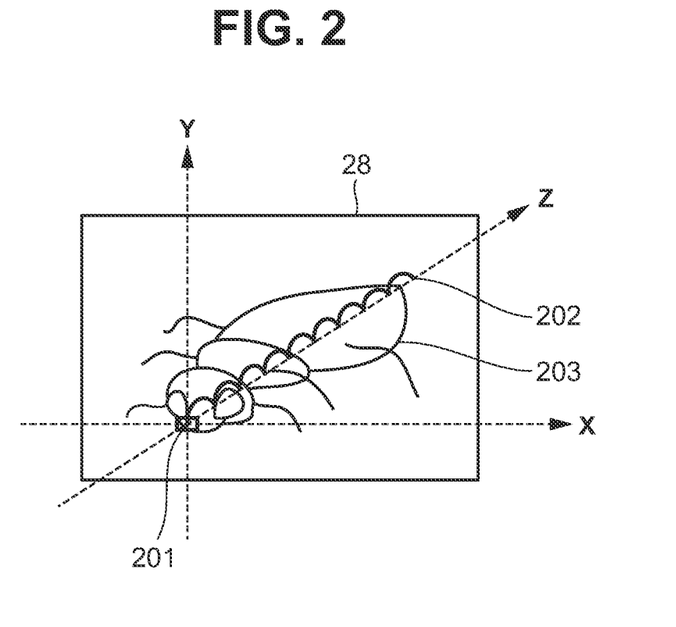
FIG. 2 is a diagram illustrating an image displayed on a display unit when a focus stacking image is live-viewed.

Basic operation in the focus stacking processing performed by the digital camera 100 will now be described with reference to FIG. 2. FIG. 2 is a diagram illustrating an image displayed on the display unit 28 when the focus stacking image is live-viewed according to the present exemplary embodiment. A position 201 indicates a closest-distance-side focus position in the focus bracketing indicated by an AF frame, a position 202 indicates an infinite-distance-side focus position, and a position 203 indicates a subject (in this example, insect). The AF frame indicating the closest-distance-side focus position 201 and the subject 203 are displayed on the display unit 28. The user operates the operation unit 70 to designate a reference focus position on the image displayed on the display unit 28. Alternatively, a subject detected by the AF evaluation value detection unit 23 may be automatically designated as the reference focus position. In FIG. 2, a portion of the subject 203 on the closest distance side is designated as the reference focus position. Thus, the system control unit 50 recognizes the position designated as the reference focus position as the closest-distance-side focus position 201 in the focus bracketing, and displays the AF frame at the position 201. After the closest-distance-side focus position 201 is determined, the focus position at which the focus bracketing ends, specifically, the infinite-distance-side focus position is determined based on a focus interval corresponding to setting of the focus step in a Z-axis direction (depth direction) and the number of times of imaging. In FIG. 2, the entire subject 203 falls within a focus range from the closest-distance-side focus position 201 to the infinite-distance-side focus position 202. In this illustration, the number of times of imaging to generate one focus stacking image is 10 times, and the focus stacking unit 25 performs the focus stacking processing using 10 captured images.

Figure 3:
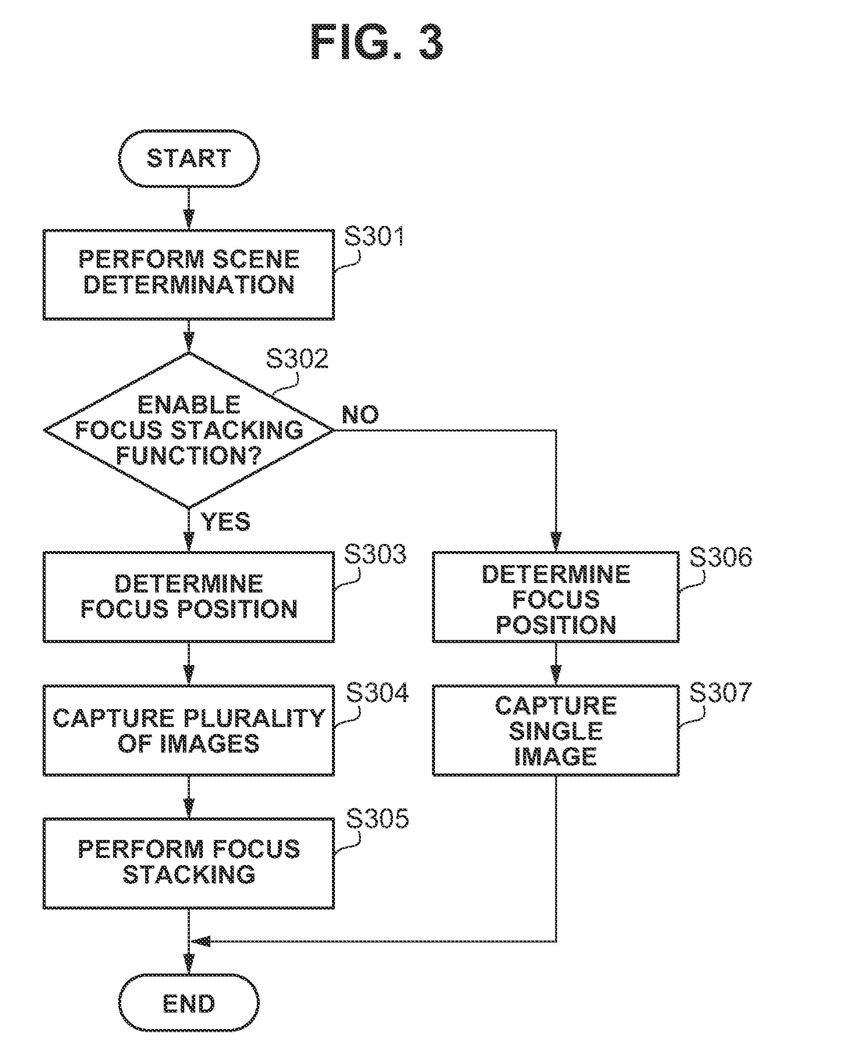
FIG. 3 is a flowchart illustrating focus stacking according to a first exemplary embodiment of the present disclosure.

Next, the focus stacking processing according to the present exemplary embodiment will be described with reference to FIG. 3. FIG. 3 is a flowchart illustrating the focus stacking according to the present exemplary embodiment. In step S301, the system control unit 50 performs scene determination on a live-view image captured by the imaging unit 22. A specific determination method will be described below. In step S302, the system control unit 50 determines whether to enable the focus stacking function, based on a result of the scene determination, and sets one focus position in step S306 or sets a plurality of focus positions in step S303.

In step S303, the system control unit 50 determines the focus positions and the number of times of imaging for the focus stacking. The system control unit 50 may set the focus step based on an exposure control value, and may change the number of focus positions. This processing is performed in order to reduce a processing time and a blur amount by reducing the number of images to be captured, against increase of the imaging time and a camera shake amount with increase of an exposure time. The system control unit 50 may determine whether to change the number of focus positions, based on an attachment/detachment state of the tripod detected by the state detection unit 27.

In step S304, the system control unit 50 performs driving control of the focus lens 103 and the shutter 101 to cause the imaging unit 22 to sequentially capture images at the plurality of different focus positions set in step S303. In step S305, the focus stacking unit 25 generates an image extended in depth of field using the plurality of images captured in step S304. In step S307, the system control unit 50 performs the driving control of the focus lens 103 and the shutter 101 to cause the imaging unit 22 to capture an image at the focus position set in step S306.

The focus stacking processing in step S305 is now described in detail.

The focus stacking processing according to the present exemplary embodiment may be performed using a known technique, and is performed in the following manner as an example.

Initially, the image processing unit 24 performs alignment on the focus stacking target images. The image processing unit 24 sets a plurality of blocks in a reference image that is one of the plurality of focus stacking target images. It is desirable that the image processing unit 24 sets the blocks so as to have the same size. Subsequently, the image processing unit 24 sets a search range wider than each of the blocks in the reference image at the respective position same as the position of each of the blocks in the reference image in each of the alignment target images. Finally, the image processing unit 24 calculates, in each of the search ranges of the target images, a corresponding point at which a sum of absolute difference (hereinafter, referred to as SAD) in luminance from the corresponding block in the reference image is minimized. The image processing unit 24 calculates, as a vector, a positional deviation from a center of each of the blocks in the reference image and the above-described corresponding point. In calculation of the above-described corresponding point, the image processing unit 24 may use a sum of squared difference (hereinafter, referred to as SSD), a normalized cross correlation (hereinafter, referred to as NCC), or the like, in addition to SAD.

Subsequently, the image processing unit 24 calculates a transformation coefficient from the positional deviation amount between the reference image and each of the target images. The image processing unit 24 uses, for example, a projective transformation coefficient as the transformation coefficient. The transformation coefficient, however, is not limited only to the projective transformation coefficient, and an affine transformation coefficient or a simplified transformation coefficient only including a horizontal/vertical shift may be used.

For example, the image processing unit 24 can perform transformation using expression (1).

$$I' = \begin{bmatrix} x' \\ y' \\ 1 \end{bmatrix} = AI = \begin{bmatrix} a & b & c \\ d & e & f \\ g & h & i \end{bmatrix} \begin{pmatrix} x \\ y \\ 1 \end{pmatrix} \quad (1)$$

In the expression (1), (x', y') indicates coordinates after the transformation is performed, and (x, y) indicates coordinates before the transformation is performed. A matrix A indicates the transformation coefficient.

After the alignment, the focus stacking unit 25 calculates a contrast value of each of the aligned images.

As an example of a method of calculating the contrast value, a luminance Y is initially calculated using the following expression (2) from color signals Sr, Sg, and Sb of each of the pixels.

$$Y = 0.299Sr + 0.587Sg + 0.114Sb \quad (2)$$

Subsequently, as represented by the following expressions (3) to (5), a Sobel filter is applied to a matrix L of the luminance Y of 3×3 pixels to calculate a contrast value I.

$$I_h = \begin{pmatrix} -1 & 0 & 1 \\ -2 & 0 & 2 \\ -1 & 0 & 1 \end{pmatrix} \cdot L \quad (3)$$

$$I_v = \begin{pmatrix} -1 & -2 & -1 \\ 0 & 0 & 0 \\ 1 & 2 & 1 \end{pmatrix} \cdot L \quad (4)$$

$$I = \sqrt{I_h^2 + I_v^2} \quad (5)$$

The above-described method of calculating the contrast value is merely illustrative. For example, an edge detection filter, such as a Laplacian filter, and a bandpass filter allowing passage of a predetermined band are usable.

Subsequently, the focus stacking unit 25 generates a combination map. As a method of generating the combination map, the focus stacking unit 25 compares the contrast values of the pixels at the same position in the respective images, and calculates a combination ratio corresponding to the contrast values.

An example of a specific calculation method is described below.

The focus stacking unit 25 generates a combination map Am(x, y) using a contrast value Cm(x, y), where m indicates an m-th image among the plurality of images different in focus position, x indicates a horizontal coordinate of the image, and y indicates a vertical coordinate. As the method of generating the combination map, the focus stacking unit 25 compares the contrast values of the pixels at the same position in the respective images, and calculates a combination ratio corresponding to the contrast values. More specifically, among the pixels at the same position, a combination ratio of 100% is given to the pixel having the greatest contrast value, and a combination ratio of 0% is given to the other pixels at the same position. In other words, the following expression (6) is established.

$$A_m(x, y) = \max_{k=1} C_k(x, y) \quad (6)$$

At this time, the combination ratio is to be appropriately adjusted to prevent a boundary from becoming unnatural. Thus, the combination ratio in the combination map in one image is not limited to two values of 0% and 100% but is continuously varied.

The focus stacking unit 25 generates an omnifocal image O(x, y) by combining the captured images based on the calculated combination map. When the original captured images are denoted by Im(x, y), the image is generated by the following expression (7).

$$O(x, y) = \sum_{k=1}^{M} B_k(x, y) \times I_k(x, y) \quad (7)$$

The example of the focus stacking processing in step S305 has been described above.

Figure 4:
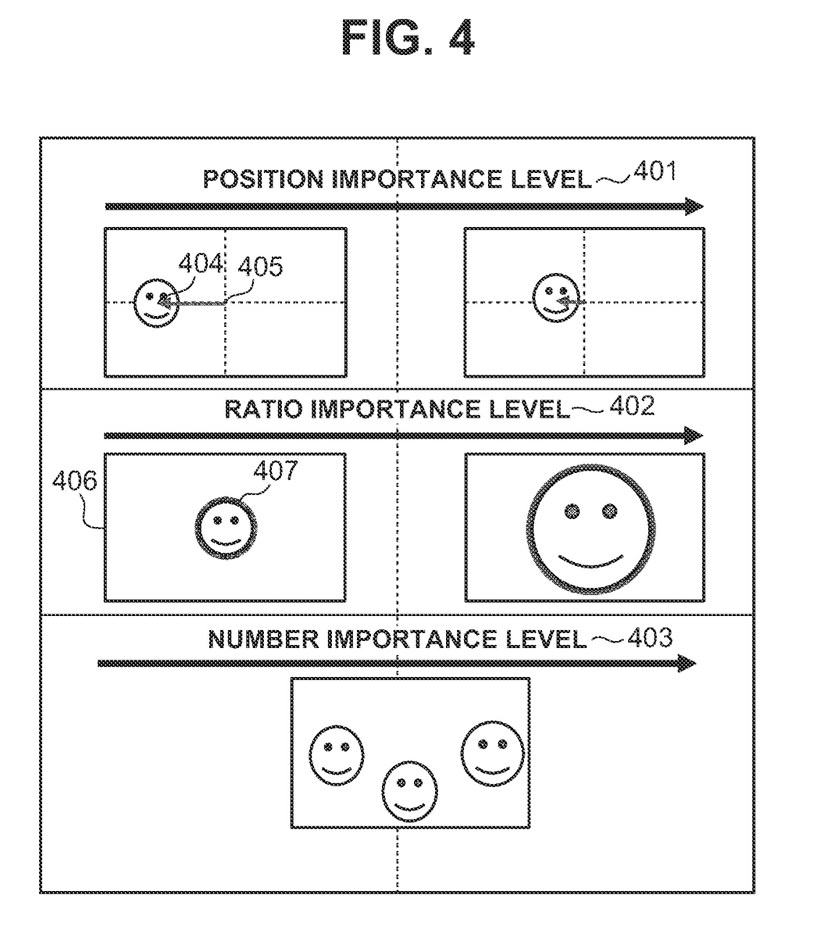
FIG. 4 is a diagram illustrating an example of main subject detection according to the first exemplary embodiment of the present disclosure.

Next, the scene determination in step S301 will be described. In the present exemplary embodiment, a description will be provided as an example of a case where a face of a person to be picked up is detected as a main subject from the live-view image, and the scene is determined based on a position, a size, and the number of faces of the persons to be picked up, and the like. FIG. 4 is a diagram illustrating an example of main subject detection according to the present exemplary embodiment. Initially, the AF evaluation value detection unit 23 detects the face of the person to be picked up. Subsequently, the system control unit 50 calculates an importance level 401 based on a position of the face of the person to be picked up detected by the AF evaluation value detection unit 23, an importance level 402 based on a ratio of the face of the person to be picked up occupying the angle of view, and an importance level 403 based on the number of faces of persons to be picked up. More specifically, as the importance level 401, the system control unit 50 may set a value negatively correlated with a distance between a face center position 404 of the person to be picked up and a center of an angle of view 405. As the importance level 402, the system control unit 50 may set a value positively correlated with a ratio of a face 407 of the person to be picked up occupying an angle of view 406. As the importance level 403, the system control unit 50 may set a value positively or negatively correlated with the number of faces of persons to be picked up.

In a case where the importance level of the main subject is greater than a predetermined threshold, the system control unit 50 determines to perform the focus stacking. In a case where the system control unit 50 performs the focus stacking, it is determined that the focus position is set at the main subject (face of person to be picked up), and a composite image in which the main subject is in focus and a background is blurred can be generated. In contrast, in a case where the system control unit 50 determines not to perform the focus stacking, only one image is captured so as to have a deep depth of field covering the background.

The above description has been provided on the premise that the main subject is the face of the person to be picked up; however, the main subject is not limited thereto.

Figure 5:
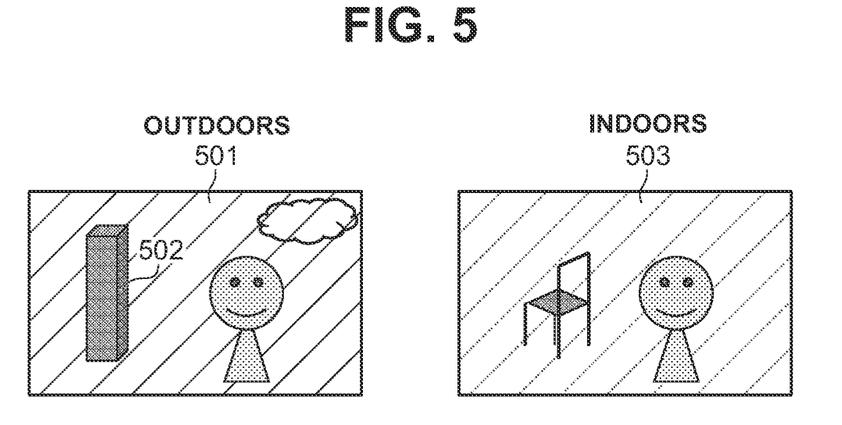
FIG. 5 is a diagram illustrating an example of background region detection according to the first exemplary embodiment of the present disclosure.

In step S301, the system control unit 50 calculates a region other than the main subject detected by the AF evaluation value detection unit 23, as a background region. FIG. 5 is a diagram illustrating an example of background region detection according to the present exemplary embodiment. The system control unit 50 acquires an image focused on the background region, and calculates an importance level of the background region. In a case where the importance level of the background region is less than a predetermined threshold, the system control unit 50 determines to perform the focus stacking. For example, in FIG. 5, in a case where the AF evaluation value detection unit 23 detects a subject 502 in the background region of an image 501, the system control unit 50 increases the importance level of the background region. The system control unit 50 may determine whether each of the image 501 and an image 503 has been captured outdoors, based on calculation results of the exposure control value and the ranging control value obtained by the image processing unit 24, and in a case where it is determined that the image has been captured outdoors, the importance level of the background region may be increased. In a case of outdoor imaging, in particular, in a case where a landmark is present on the background region, it is desirable that one image is captured to have deep depth of field in order to cause the landmark to be in focus. The increasing the importance level of the background region in the case of outdoor imaging is intended for a case where the landmark is present on the background region in the outdoor imaging.

The system control unit 50 may perform both of the main subject detection and the background region detection, and may determine whether to perform the focus stacking, based on both importance levels.

According to the first exemplary embodiment, the image processing apparatus can detect the main subject, the background region, and the like from the live-view image, and can automatically determine whether to perform the focus stacking based on the result of the detection.

A second exemplary embodiment of the present disclosure will be described below with reference to the drawings. In the second embodiment, determination as to whether to perform the focus stacking is made before and after the scene determination, unlike the first exemplary embodiment. The second exemplary embodiment is described below focusing on differences from the first exemplary embodiment.

Figure 6:
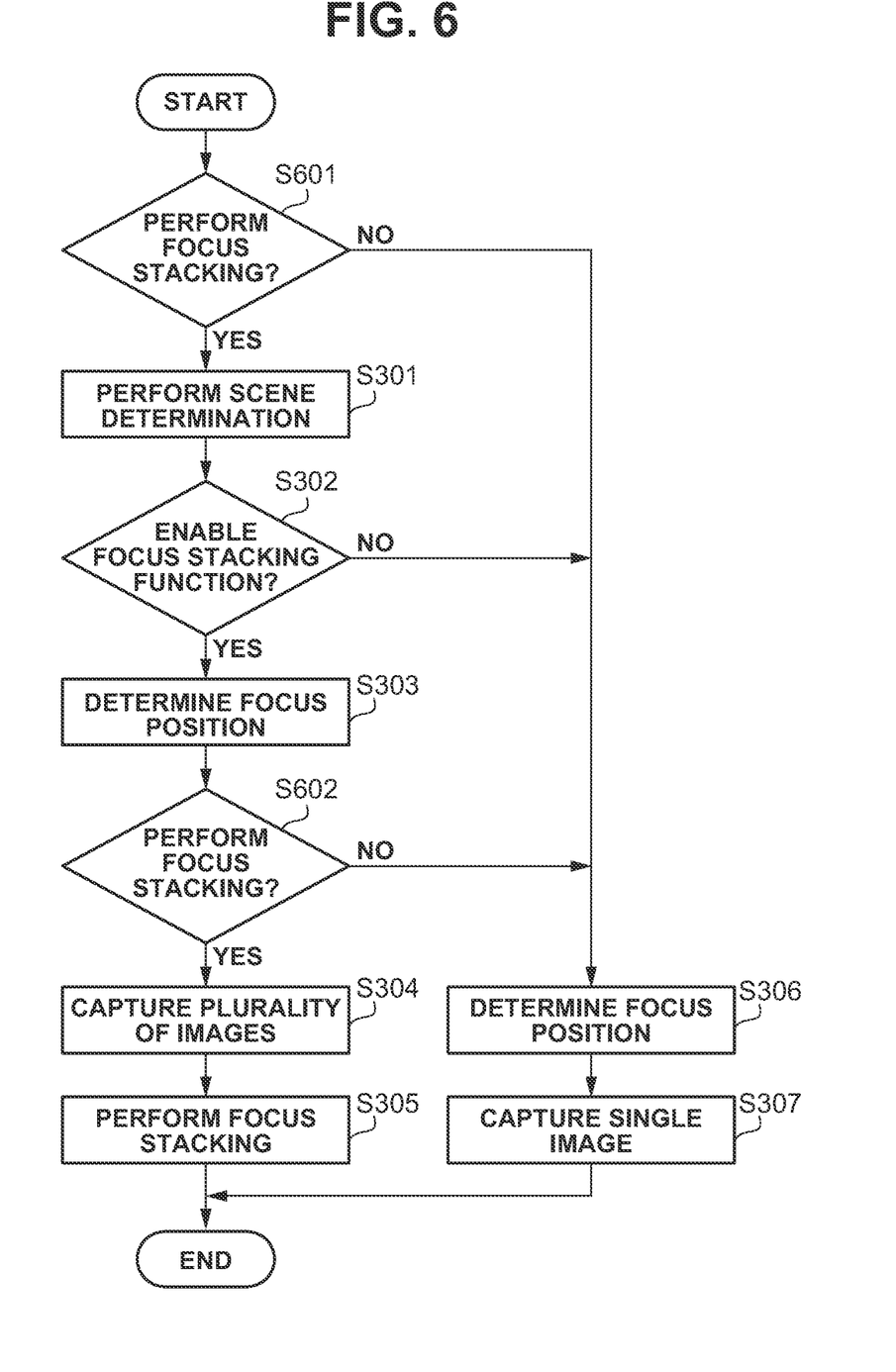
FIG. 6 is a flowchart illustrating focus stacking processing according to a second exemplary embodiment of the present disclosure.

FIG. 6 is a flowchart illustrating focus stacking processing according to the second exemplary embodiment. In the second exemplary embodiment, the determination as to whether to perform the focus stacking is made in step S601 before the scene determination in step S301, and in step S602 after the scene determination in step S301, which are some of the characterizing features in the second exemplary embodiment.

In step S601, the system control unit 50 determines whether to perform the focus stacking, based on the live-view image before the scene determination or setting of the digital camera 100. In a case where the system control unit 50 determines in step S601 not to perform the focus stacking (NO in step S601), the processing proceeds to step S306. In step S306, the system control unit 50 performs control to capture only one image.

In the determination as to whether to perform the focus stacking in step S601, for example, in a case where the motion detection unit 26 detects a moving subject, the system control unit 50 determines not to perform the focus stacking, and the processing proceeds to step S306. This processing is performed to prevent quality degradation of the composite image due to combination of a region with motion. As another example of the determination as to whether to perform the focus stacking in step S601, the system control unit 50 determines whether the imaging mode is a selfie mode in which an imaging person captures an image of themselves, based on the state of the digital camera 100 detected by the state detection unit 27, and determines that the focus stacking is not to be performed if the system control unit 50 is determined that the imaging mode is the selfie mode. Examples of the state of the digital camera 100 for which the system control unit 50 determines that the imaging mode is the selfie mode includes a state in which the display unit 28 (monitor) is pointed in a lens direction in which the lens is pointed. If the display unit 28 is a vari-angle monitor, such a state is the one in which the display unit 28 is flipped out to rotate 180 degrees. If the display unit 28 is a tilt monitor, such a state is the one in which the display unit 28 is moved in a certain direction to be pointed in the lens direction. Moreover, the automatic determination as to whether to perform the focus stacking is enabled as well for devices configured such that the direction in which a display unit (monitor) is pointed can be matched with the lens direction, such as smartphones provided with a front camera, among imaging processing apparatuses other than the digital camera. The reason for such a determination is that the main subject is distant from the background in the optical axis direction in the selfie mode so that the focus stacking is not suitable.

Next, determination as to whether to perform the focus stacking in step S602 is described. After the system control unit 50 enables the focus stacking in step S302, and the focus positions are determined in step S303, the determination as to whether to perform the focus stacking is made in step S602. In other words, unlike step S601, the setting for the focus stacking (e.g., number of times of imaging, and focus step) has been performed at the time of step S602.

In step S602, the system control unit 50 determines whether to perform the focus stacking, based on the setting for the focus stacking determined in step S303. For example, in a case where the determined number of images to be captured is greater than a predetermined threshold, the system control unit 50 determines not to perform the focus stacking. This processing is performed to prevent a processing time from being increased due to increase in the number of images to be captured. In this case, in the imaging in step S307, an aperture may be adjusted so as to capture one image having a depth of field corresponding to a depth of field of a composite image obtainable in a case where the focus stacking is performed.

In step S602, the system control unit 50 predicts the depth of field of the focus stacking image from the determined focus positions and the depth of field of one image. In a case where the system control unit 50 predicts that the depth of field of the focus stacking image is shallower than the predetermined threshold, the system control unit 50 determines not to perform the focus stacking. This is because the shallow depth of field of the composite image leads to few advantages of the focus stacking. Further, at this time, the system control unit 50 may simply predict the depth of field of the focus stacking image from the focus positions at both ends among the determined focus positions.

In the present exemplary embodiment, only one of the operation in step S601 and the operation in step S602 may be performed.

According to the second exemplary embodiment, in the case where it is determined that the focus stacking is not to be performed based on the state of the camera, the moving subject detection, the determined focus positions, and the like before and after the scene determination, it is possible to determine not to perform the focus stacking.

Other Exemplary Embodiments

The above-described exemplary embodiments have been described based on implementation in the digital camera; however, implementation of the exemplary embodiments is not limited to the digital camera. For example, some embodiments are applicable to a mobile device including an imaging element and to a network camera capable of capturing images.

Some embodiments can be realized by supplying programs realizing one or more functions of the above-described exemplary embodiments to a system or an apparatus through a network or a storage medium, and causing one or more processors in a computer of the system or the apparatus to read out and execute the programs. Some embodiments can also be realized by a circuit (e.g., application specific integrated circuits (ASIC)) realizing one or more functions.

According to the present disclosure, the imaging apparatus can set the focus stacking without operation by the user.

OTHER EMBODIMENTS

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-200665, which was filed on Dec. 10, 2021 and which is hereby incorporated by reference herein in its entirety.

What is claimed is:

1. An apparatus, comprising:
   at least one memory configured to store instructions; and
   at least one processor in communication with the at least one memory and configured to execute the instructions to:
   perform scene determination;
   determine whether a moving subject exists in a plurality of images different in focus position in an optical axis direction; and
   in a case where no moving subject exists, generate a composite image based on a result of the scene determination, wherein generating the composite image includes combining the plurality of images different in focus position in the optical axis direction, and wherein the composite image is deeper in depth of field than the plurality of images,
   wherein the at least one processor is configured to further execute the instructions to determine, in the scene determination, an importance level based on a position of a subject, a ratio of the subject occupying an angle of view, and a number of subjects, and
   wherein the combining is performed in a case where the importance level is greater than a predetermined first threshold.

2. The apparatus according to claim 1, wherein the at least one processor is configured to further execute the instructions to perform the scene determination on the plurality of images.

3. The apparatus according to claim 1, wherein a distance between the position of the subject and a center of the angle of view is negatively correlated with the importance level.

4. The apparatus according to claim 1, wherein the ratio of the subject occupying the angle of view is positively correlated with the importance level.

5. The apparatus according to claim 1,
   wherein the at least one processor is configured to further execute the instructions to determine whether a background is outdoors in the scene determination, and
   wherein the combining is not performed in a case where the background is outdoors.

6. The apparatus according to claim 1, wherein the at least one processor is configured to further execute the instructions to extract an in-focus region in each of the plurality of images to generate the composite image.

7. The apparatus according to claim 1, wherein the at least one processor is configured to further execute the instructions to not perform the combining in a case where a depth of field of the composite image generated in a case where the combining is performed is shallower than a predetermined second threshold.

8. An apparatus, comprising:
   an image sensor configured to capture a plurality of images different in focus position in an optical axis direction;
   at least one memory configured to store instructions; and
   at least one processor in communication with the at least one memory and configured to execute the instructions to:
   perform scene determination;
   determine whether a moving subject exists in a plurality of images different in focus position in an optical axis direction; and
   in a case where no moving subject exists, generate a composite image based on a result of the scene determination, wherein generating the composite image includes combining the plurality of images, and wherein the composite image is deeper in depth of field than the plurality of images;
   wherein the at least one processor is configured to further execute the instructions to not perform the combining in a case where the image sensor images an imaging person; and
   wherein the at least one processor is configured to further execute the instructions to:
   detect a state of the image sensor and/or an optical system; and determine whether the image sensor images the imaging person, based on the state of the image sensor and/or the optical system.

9. The apparatus according to claim 8, wherein the at least one processor is configured to further execute the instructions to perform the scene determination on a live-view image acquired by the image sensor.

10. The apparatus according to claim 8,
wherein the at least one processor is configured to further execute the instructions to cause the image sensor to capture one image again in a case where the combining is not performed.

11. The apparatus according to claim 10, wherein the at least one processor is configured to further execute the instructions to determine, in a case where the combining is not performed, a depth of field of the image to be captured by the image sensor based on a depth of field of the composite image obtainable in the case where the combining is performed.

12. The apparatus according to claim 8,
wherein the at least one processor is configured to further execute the instructions to determine the focus positions of the images to be captured by the image sensor, and
wherein, in a case where the number of the focus positions is greater than a predetermined third threshold, the combining is not performed.

13. The apparatus according to claim 8, wherein the at least one processor is configured to further execute the instructions to determine the focus positions of the plurality of images to be captured by the image sensor based on an exposure control value.

14. An image processing method, comprising:
performing scene determination as to whether a moving subject exists; and
in a case where no moving subject exists, generating a composite image based on a result of the scene determination, wherein generating the composite image includes combining a plurality of images different in focus position in an optical axis direction, wherein the composite image is deeper in depth of field than the plurality of images, and wherein the combining is automatically performed based on a result of the scene determination;
wherein, in the scene determination, determining an importance level based on a position of a subject, a ratio of the subject occupying an angle of view, and a number of subjects, and wherein the combining is performed in a case where the importance level is greater than a predetermined first threshold.

15. A non-transitory computer-readable storage medium which stores instructions for causing a computer of an apparatus to execute a method comprising:
performing scene determination as to whether a moving subject exists; and
in a case where no moving subject exists, generating a composite image based on a result of the scene determination, wherein generating the composite image includes combining a plurality of images different in focus position in an optical axis direction, wherein the composite image is deeper in depth of field than the plurality of images, and wherein the combining is automatically performed based on a result of the scene determination;
wherein, in the scene determination, determining an importance level based on a position of a subject, a ratio of the subject occupying an angle of view, and a number of subjects, and wherein the combining is performed in a case where the importance level is greater than a predetermined first threshold.

16. An apparatus, comprising:
an image sensor configured to capture a plurality of images different in focus position in an optical axis direction;
at least one memory configured to store instructions; and
at least one processor in communication with the at least one memory and configured to execute the instructions to:
perform scene determination;
determine whether a moving subject exists in a plurality of images different in focus position in an optical axis direction; and
in a case where no moving subject exists, generate a composite image based on a result of the scene determination, wherein generating the composite image includes combining the plurality of images, and wherein the composite image is deeper in depth of field than the plurality of images;
wherein the at least one processor is configured to further execute the instructions to cause the image sensor to capture one image again in a case where the combining is not performed; and
wherein the at least one processor is configured to further execute the instructions to determine, in a case where the combining is not performed, a depth of field of the image to be captured by the image sensor based on a depth of field of the composite image obtainable in the case where the combining is performed.

* * * * *